(12) United States Patent  
Knight (10) Patent No.: US 6,678,455 B1  
(45) Date of Patent: Jan. 13, 2004

(54) FIBER OPTIC CABLE BEND RADIUS MANAGEMENT SYSTEM

(75) Inventor: Paul A. Knight, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/658,296

(22) Filed: Sep. 8, 2000

(51) Int. Cl.⁷ .................................................. G02B 6/00
(52) U.S. Cl. ........................................................ 385/134
(58) Field of Search .................................. 385/134, 135

(56) References Cited

U.S. PATENT DOCUMENTS

| | | | |
|---|---|---|---|
| 4,932,744 A | 6/1990 | Messelhi | 350/96.2 |
| 5,457,763 A | 10/1995 | Kerry et al. | 385/135 |
| 5,469,526 A | 11/1995 | Rawlings | 385/135 |
| 5,497,444 A | 3/1996 | Wheeler | |
| 5,590,234 A | 12/1996 | Pulido | 385/135 |
| 5,659,641 A * | 8/1997 | DeMeritt et al. | 385/14 |
| 5,911,027 A * | 6/1999 | Macken et al. | 385/135 |
| 5,913,006 A * | 6/1999 | Summach | 385/134 |
| 5,999,668 A * | 12/1999 | Hernandez et al. | 385/12 |
| 6,167,183 A * | 12/2000 | Swain | 385/134 |

* cited by examiner

*Primary Examiner*—Hemang Sanghaui
(74) *Attorney, Agent, or Firm*—Wells St. John P.S.

(57) ABSTRACT

Disclosed is a fiber optic bend radius protection apparatus and cable management system for use in combination with a plurality of vertically spaced fiber optic cables. Embodiments of the invention provide a plurality of fiber guides used in combination to provide minimum bend radius even in situations in which the vertical spacing between adjacent fiber optic cables is less than the desired minimum bend radius. Other embodiments of the invention provide an improved fiber optic cable management system which reduces fiber optic cable displacement when accessing or installing fiber optic cables on fiber guides, by providing a movable side guide.

24 Claims, 7 Drawing Sheets

FIBER OPTIC CABLE BEND RADIUS MANAGEMENT SYSTEM

TECHNICAL FIELD

This invention relates to a fiber optic cable bend radius management system particularly well suited for use in high density fiber assemblies and frameworks.

BACKGROUND OF THE INVENTION

In the telecommunications industry there are numerous locations where a significant amount of fiber optic cable must be routed within a facility or from one facility to another. The number of fibers may be great and the fibers must all be handled with great care to avoid damage to the fiber optic cable, which hinders its performance. For instance, it is important to maintain a minimum bend radius to protect the fiber optic cables. A minimum bend radius may for example be one and one-half inches, it may be thirty millimeters (30 mm) or any other standard adopted for a particular fiber optic cable.

Fiber optic cable distribution frames, bays or panels are generally utilized to provide termination, cross-connect, splice, patch and storage interface between fiber-optic cables that lead to user installations.

These bays typically include high density fiber distribution frameworks which include fiber-optic cross connection and/or patching functions or features. Typically, but not always, outside plant (OSP) fiber optic cables are routed into the facility and need to be connected to equipment or to other fiber optic cable.

The increase in use of telecommunication fiber optic cables has brought with it the need to increase the capacity of existing facilities, and the need to increase the density of connections or inter-connections per given area.

As density increases and the vertical spacing between fiber optic connectors decreases, the management of the fiber optic cable and the maintenance of the minimum bend radius becomes more and more difficult due to the geometrical limitations imposed by the decreased vertical spacing of the fiber optic connectors.

Figure 1:
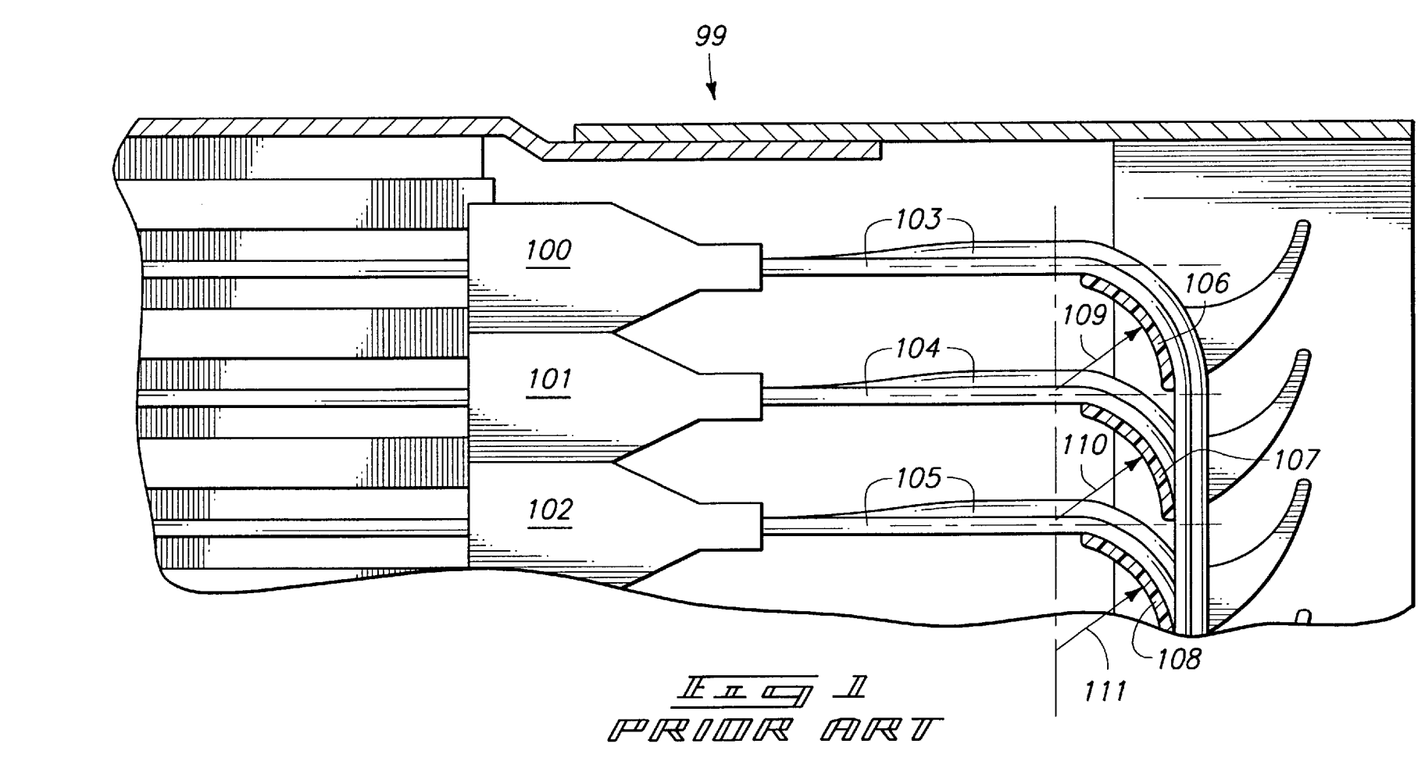
FIG. 1 is a side view of connectors in a typical prior art fiber optic connector assembly.

FIG. 1 illustrates the problems with the current prior art. FIG. 1 is a side view of fiber optic connectors in a typical prior art fiber optic connector assembly, and shows fiber support guides which do not provide sufficient bend radius protection and further do not provide the minimum bend radius protection for a full ninety degrees of bend, in situations where the vertical spacing between vertically adjacent fiber optic cables or connectors is decreased below a certain distance. The minimum bend protection angle need not be any angle in particular, such as ninety degrees.

In some of the higher density applications in which the center-to-center spacing between fiber optic cables in the connectors is less than the minimum bend radius, the minimum bend radius has not always been maintained.

Embodiments of this invention utilize a combination of a first fiber guide structure and a second fiber guide structure, wherein the first fiber guide structure may, but need not, be dissimilar to the second fiber guide structure. This dissimilarity may be in length, shape, horizontal position and/or orientation.

It is also desirable to minimize the necessary movement of fiber optic cable, including when placing the cable on fiber optic cable supports and fiber guides. In some prior art fiber supports and guides, there are insufficient side walls to assure the fiber optic cables don't slip or become dislodged from the guide or support. In other prior art fiber supports and guides, such as with fanning strips for instance, there is a sufficient side wall or side guide, but in order to place and remove fiber optic cable onto the guide or support, the cable must be moved up and over the side guide or side wall, thus causing unnecessary displacement of the fiber optic cable.

An embodiment of this invention provides an additional feature of a movable side guide or movable side wall, one which moves from a first position where it acts as a side guide or side wall, to a second position where it is not as much of a side guide or side wall or is not one at all. The ability to move the side guide to a first position to retain the fiber optic cable and to a second position for easy installation and removal of fiber optic cable (with minimum fiber optic cable displacement) better manages and protects the fiber optic cables.

BRIEF DESCRIPTION OF THE DRAWINGS

Preferred embodiments of the invention are described below with reference to the accompanying drawings, which are briefly described below.

FIG. 3 is a detail side view of the connectors in the fiber optic connector assembly illustrated in FIG. 2;

FIG. 8 is a side view of the fiber optic connector assembly also shown in FIG. 4, only with an embodiment of the invention illustrated providing the bend radius management system for three vertically adjacent rows of fibers.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "framework" as used herein need not be continuous or in any specific number of pieces. However it will be appreciated by those skilled in the art that the framework could be one piece, two piece or more than two pieces. Furthermore, the framework as contemplated by this invention need not be in one continuous section, but instead may also be divided up into multiple sections or segments.

The term "fiber optic connector" or "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber. Commonly used connectors are without limitation, ST Connector-Compatible connectors, FC, FCPC, Biconic, SC, E2000, D4, and SMA 905 or 906 connectors.

The term "fiber optic adapter" or "adapter" as used herein is also well known and defined in the art, and is the apparatus which retains the fiber optic connectors and provides the structure to hold the fiber optic connectors and to mount the connectors to other equipment, panels, bulkheads, frameworks, and the like. Adapter is sometimes also referred to as a coupling or mating bushing in the industry.

The term fiber guide framework as used herein is not limited to a backing piece to which the first fiber guide and the second fiber guide are attached, integral or one piece with, but also includes any structure or combination of structures which retains the first fiber guide relative to the second fiber guide.

The term fiber support surface, as used herein, means a surface which supports or guides fiber optic cables, whether the surface supports the fiber optic cable on it, supports or guides it from the side such as in a horizontal application of the fiber guides, or at any other angle.

When the term pivotally mounted is used regarding the support surface side guide, it means pivotally mounted to provide movement of the side guide in the general direction the fiber optic cable is oriented and in directions perpendicular to the direction the fiber optic cable is oriented.

FIG. 1 is a side view of connectors in a typical prior art fiber optic connector assembly 99 schematically showing first fiber optic connector 100, second fiber optic connector 101 and third fiber optic connector 102. While only one first fiber optic connector 100 is shown schematically, this is a side view of a row of multiple adjacent connectors with a first set of at least one fiber optic cable 103 (but preferably a plurality) operatively connected to the first set of fiber optic connectors 100. FIG. 1 illustrates more than one fiber optic cable 103, a first set of at least one fiber optic cable routed to fiber guide 106. Fiber guide 106 has radius 109, a bend radius. FIG. 1 also shows more than one fiber optic cable 104 (a second set of at least one fiber optic cable) attached to the row of fiber optic connectors starting with second fiber optic connector 101, routed to fiber guide 107. Fiber guide 107 has radius 110, a fiber optic cable bend radius.

FIG. 1 further illustrates fiber optic cable 105 (representing a third set of at least one fiber optic cable) attached to the row of fiber optic connectors starting with third fiber optic connector 102, routed to fiber guide 108. Fiber guide 108 has radius 111, a bend radius.

FIG. 1 illustrates certain problems associated with prior art, namely the failure to provide bend radius protection and support for a sufficient minimum bend protection angle, which is preferably ninety degrees. In order to obtain the higher density levels desired, and the reduced vertical center-to-center spacing, some have not provided the minimum bend radius required or preferred by customers.

Figure 2:
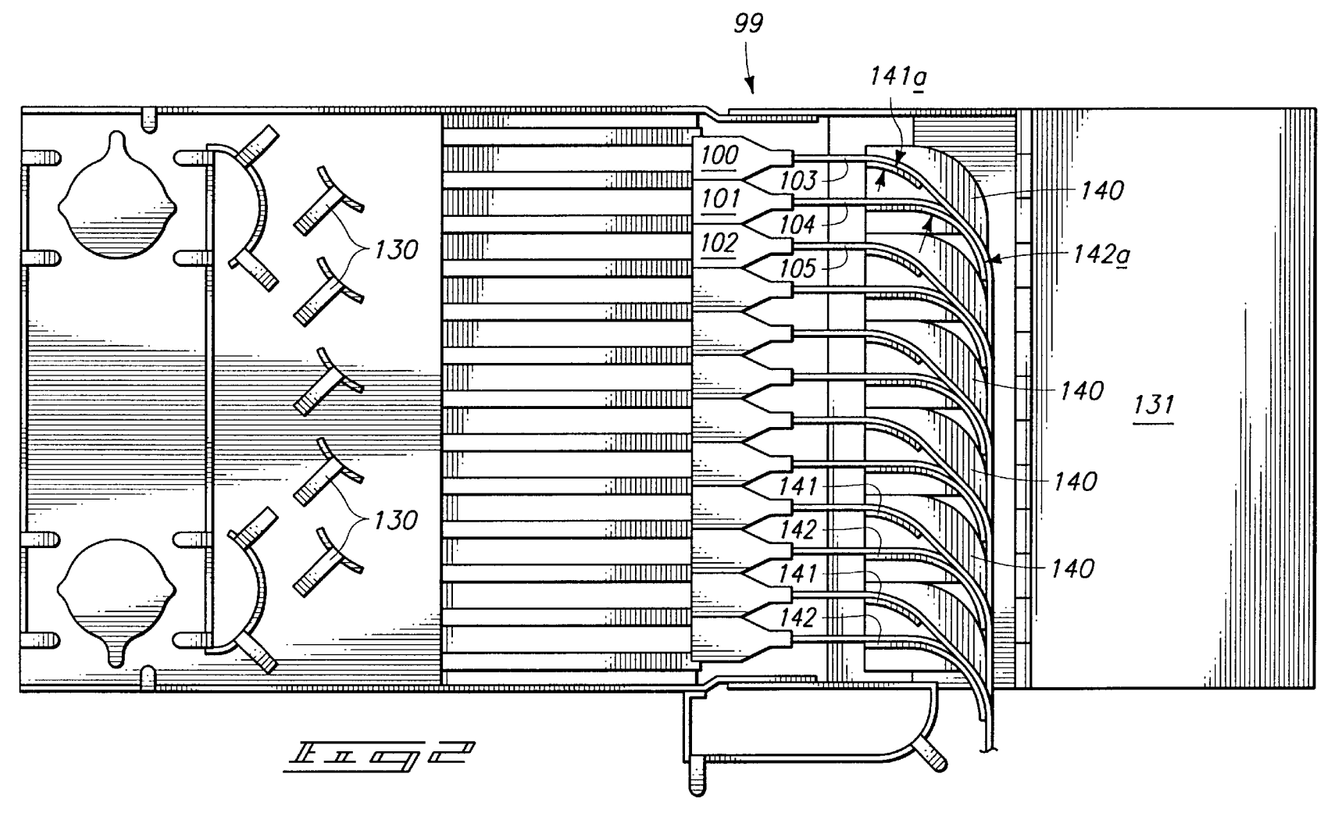
FIG. 2 is a side view of connectors in a fiber optic connector assembly in which an embodiment of this invention is illustrated providing ninety degree bend radius protection and meeting the minimum bend radius even though vertically adjacent connectors are spaced less than the minimum bend radius.

FIG. 2 is a side view of connectors in a fiber optic connector assembly 99 in which an embodiment of this invention is illustrated providing ninety degree bend radius protection and meeting the minimum bend radius even though vertically adjacent connectors are spaced less than the minimum bend radius. FIG. 2 illustrates first fiber optic connector 100, second fiber optic connector 101 and third fiber optic connector 102, a first set of at least one fiber optic cable 103, a second set of at least one fiber optic cable 104 and a third set of at least one fiber optic cable 105.

FIG. 2 illustrates fiber guide housing or framework 140, and first fiber guide 141 and second fiber guide 142 mounted on housing or framework 140, and assembly wall 131, a hinged wall or door. First fiber guide 141 includes a curved fiber support surface 141a which receives the first set of at least one fiber optic cable 103, second fiber guide 142 with curved fiber support surface 142a which receives the second set of at least one fiber optic cable 104. In the two fiber guide embodiment, there may then be another first fiber guide and second fiber guide configuration below the one described.

FIG. 3 is an enlarged partial view of the connectors in the fiber optic connector assembly 99 illustrated in FIG. 2, illustrating fiber guide housing or framework 140, and first fiber guide 141 and second fiber guide 142 mounted on housing or framework 140. First fiber guide 141 includes a curved fiber support surface 141a which receives the first set of at least one fiber optic cable 103, second fiber guide 142 with curved fiber support surface 142a which receives the second set of at least one fiber optic cable 104. First fiber guide 141 has bend radius 152 and second fiber guide 142 has bend radius 153.

FIG. 3 further illustrates the horizontal and vertical sizes of the fiber guides, namely first fiber guide horizontal length 200, first fiber guide vertical height 201, second fiber guide horizontal length 203 and second fiber guide vertical height 204.

As can be seen in the example, the fiber optic cables start approximately horizontal and end up approximately vertical, with bend radius support through the portions of the guide system where bends in the fiber optic cable are occurring. As can also be seen, the vertical center-to-center spacing of the fiber optic cables, 103 and 104 for example, is less than the bend radius for the first fiber guide 141 and the second fiber guide 142.

While the embodiments of the invention shown position the fiber guides vertically, that is only one embodiment of the invention and other embodiments may be horizontal applications, applications for routing cable upward, or any angle in between.

Figure 4:
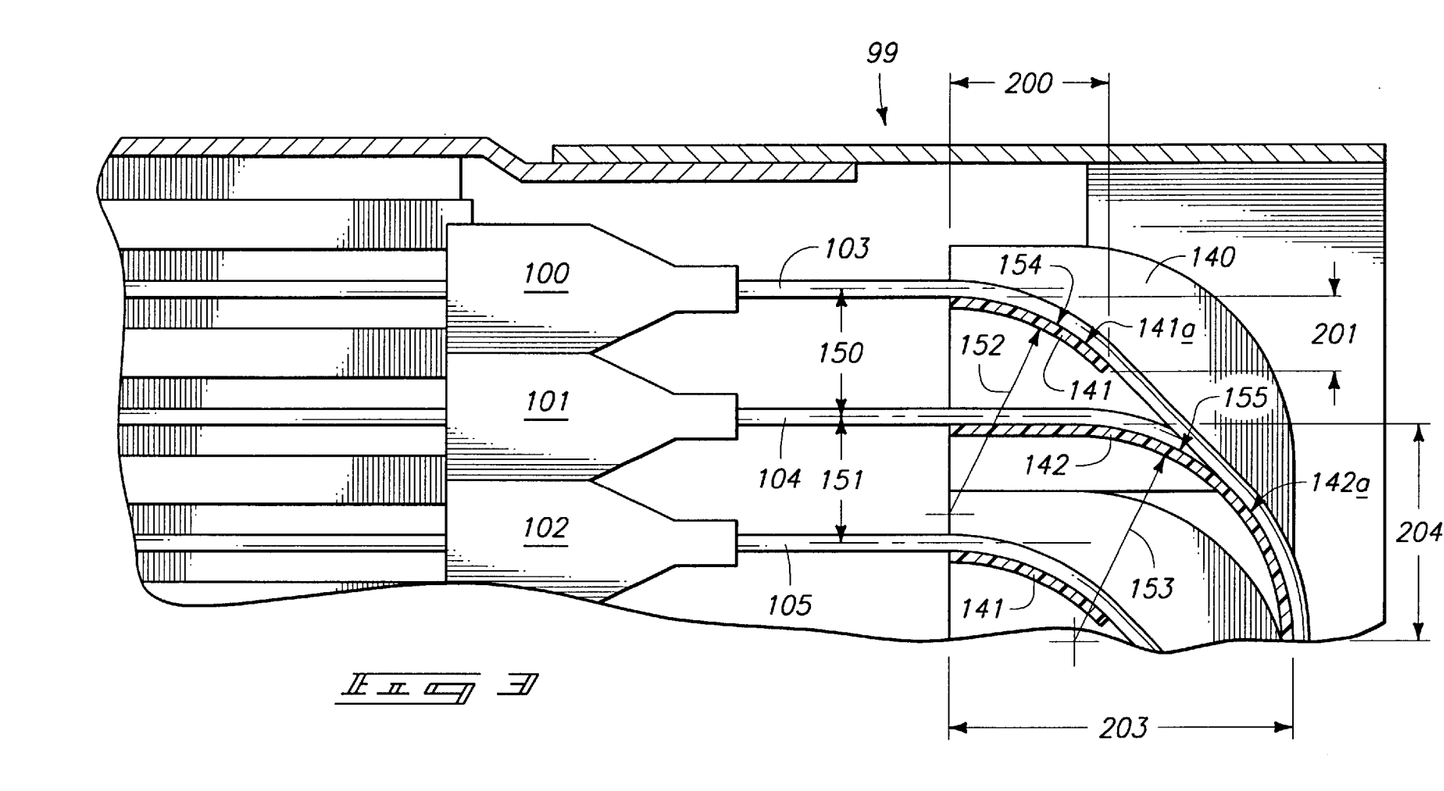
FIG. 4 is a side view of an embodiment of the invention illustrated in combination with a different fiber optic connector assembly, but still providing the bend radius management system.

FIG. 4 is a side view of a preferred fiber optic connector assembly 160, with an embodiment of the invention illustrated providing the bend radius management system. FIG. 4 shows a plurality of fiber trays 168 mounted on framework 172 via mount arms 169. Each of the trays 168 may contain connectors and fibers which are routed from the plurality of trays through the cable management area and to their destination.

In the fiber management and routing area, fiber guides are attached to housing 164. In this embodiment, a first set of at least one fiber optic cable 161 are received from a tray and supported on the fiber support surface of first fiber guide 165, and similarly a second set of at least one fiber optic cable 162 are received from a tray and supported on the fiber support surface of second fiber guide 166.

Figure 5:
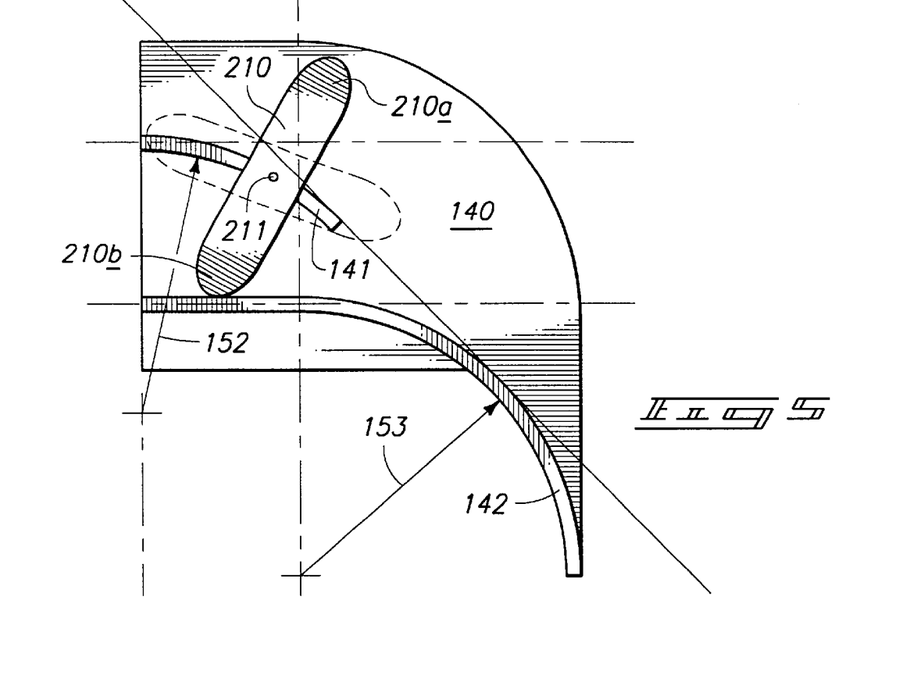
FIG. 5 is a side view of an example of an embodiment of this invention which may be utilized with fiber optic connector assemblies such as those shown in FIG. 1 or FIG. 2.

FIG. 5 is a side view of an example of an embodiment of this invention which may be utilized with fiber optic connector assemblies such as those shown in FIG. 1 or FIG. 2. FIG. 5 illustrates fiber guide housing 140, first fiber guide 141, second fiber guide 142, radius 152 of first fiber guide 141, and the radius 153 or bend radius of second fiber guide 142.

FIG. 5 further illustrates an embodiment or feature of this invention which provides pivotable side guides 210 to provide lateral walls or guides to prevent fiber optic cables from becoming dislodged from the fiber guides. The side guides 210 have a first end 210a and a second end 210b and rotate about pivot point or axis 211. As can be seen, when the side guide 210 is rotated upward, it serves to retain fibers on the first fiber guide 141 as well as retaining fibers on the second fiber guide 142. The side guide 210 may also be rotated to impose no or little obstruction to the fiber guides (also as reflected in FIG. 5), which provides easier access to add, remove or isolate fibers while minimizing the displacement of the fiber if the fiber must be lifted over the side guide 210 when one of its ends are in a more upward position. While the side guide 210 may be configured to only provide a guide for one fiber guide, it is preferred as shown in FIG. 5 such that one side guide 210 prevents the lateral movement of fibers on two fiber guides.

Figure 6:
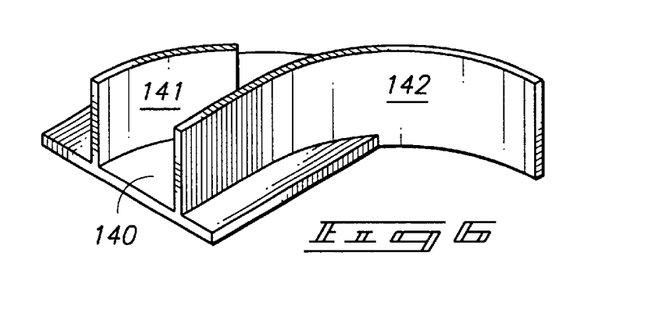
FIG. 6 is a bottom perspective view of the embodiment of this invention illustrated in FIG. 5.

FIG. 6 is a bottom perspective view of the embodiment of this invention illustrated in FIG. 5, showing fiber guide housing 140, first fiber guide 141, and second fiber guide 142.

Figure 7:
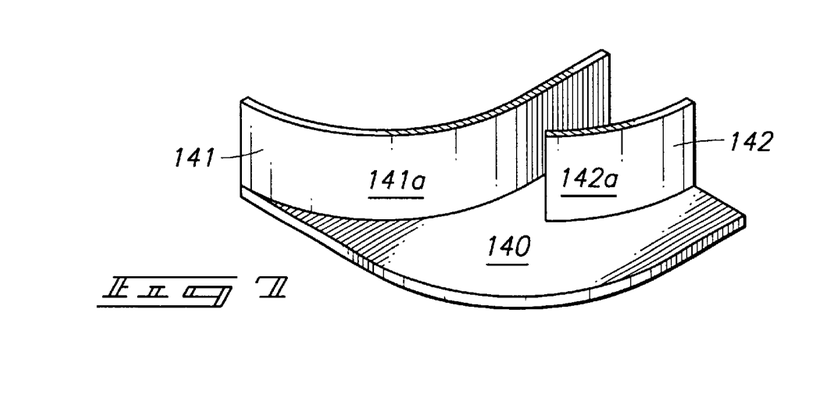
FIG. 7 is a top perspective view of the embodiment of this invention illustrated in FIG. 5.

FIG. 7 is a top perspective view of the embodiment of this invention illustrated in FIG. 5, and shows fiber guide housing 140, first fiber guide 141 with first fiber guide support surface 141a, and second fiber guide 142 with second fiber guide support surface 142a.

FIG. 8 is a side view of the fiber optic connector assembly also shown in FIG. 4, only with an embodiment of the invention illustrated providing the bend radius management system for three vertically adjacent rows of fibers. FIG. 8 shows a plurality of fiber trays 168 mounted on framework 172 via mount arms 169. Each of the trays 168 may contain connectors and fibers are routed from the plurality of trays through the cable management area and to their destination.

In the fiber management and routing area, fiber guides are attached to housing 164. In this embodiment, a third set of at least one fiber optic cable 231 are received from a tray and supported on the fiber support surface of fiber guide 180. Similarly a second set of at least one fiber optic cable 232 are received from a tray and supported on the fiber support surface of second fiber guide 182. A first set of at least one fiber optic cable 231 are received from a tray and supported on the fiber support surface of first fiber guide 181.

Figure 9:
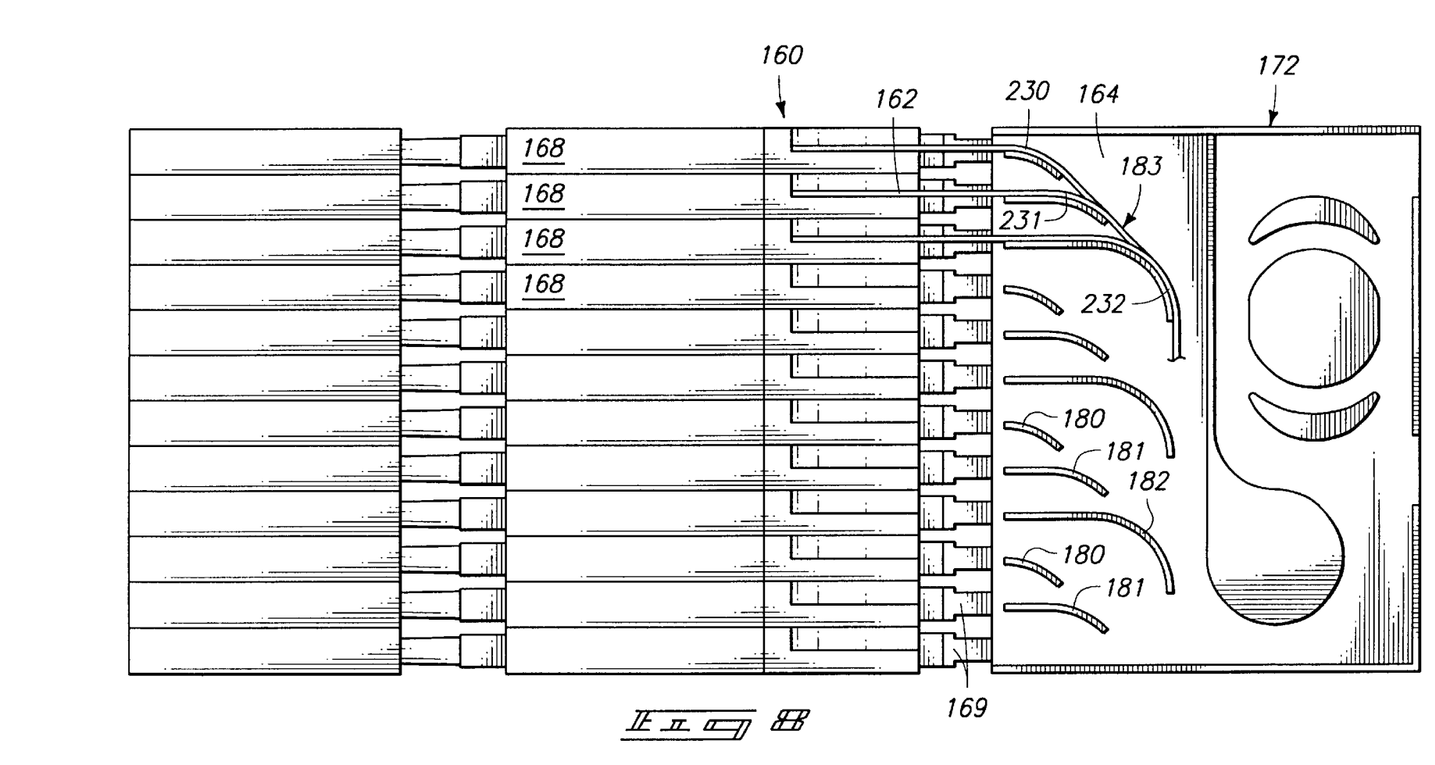
FIG. 9 is a schematic drawing of an embodiment of this invention with two vertically adjacent guides, and illustrating the preferred tangency of the two fiber guides.
Figure 11:
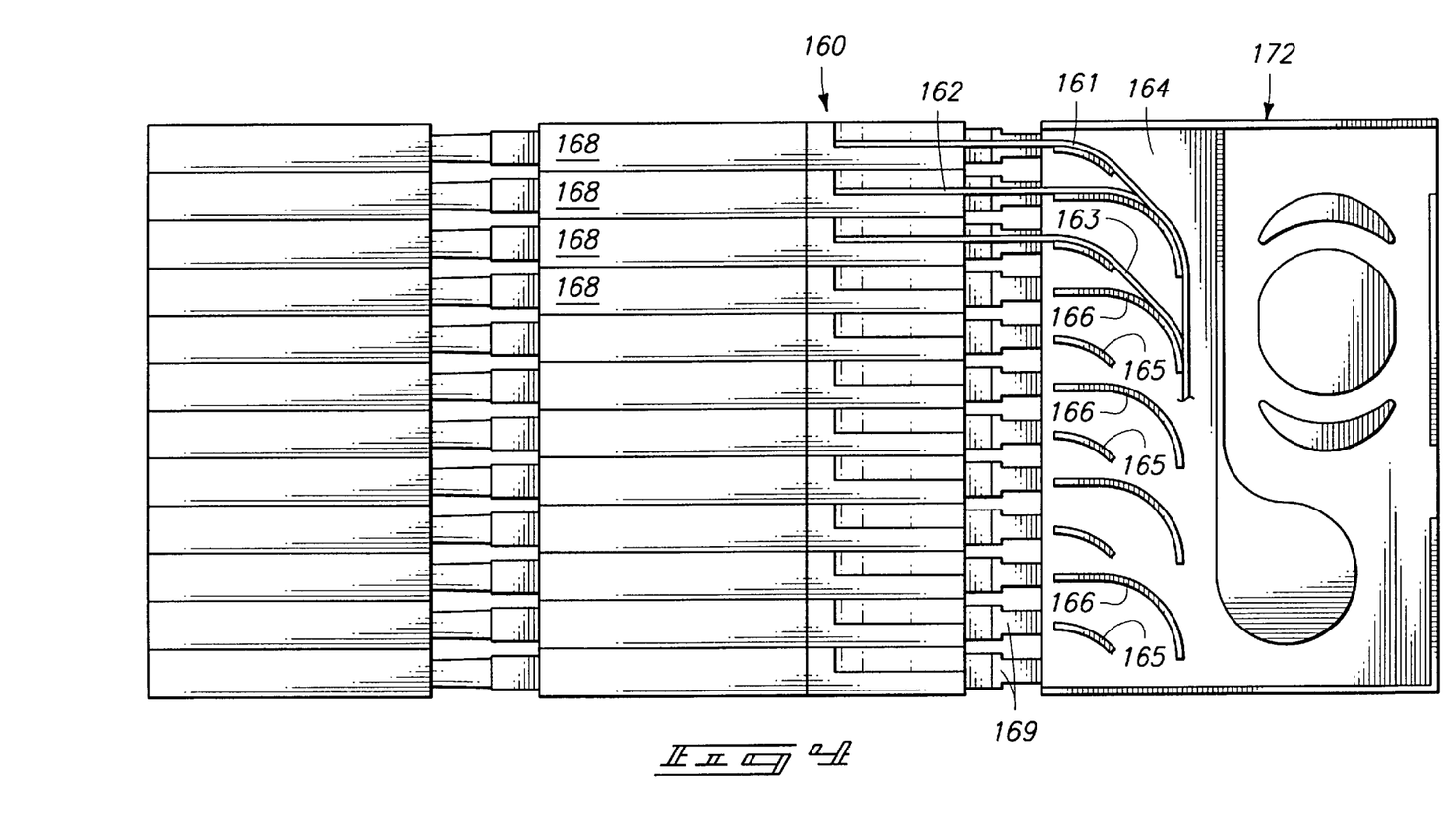

FIG. 9 is a schematic drawing of an embodiment of this invention with two vertically adjacent fiber guides, and illustrating an embodiment of a preferred tangency between the two fiber guides. First fiber guide 188 includes fiber support surface 197, radius 250 and provides bend radius support through bend protection angle 194. Second fiber guide 189 includes second fiber guide support surface 196, radius 192 and provides bend radius support through bend protection angle 193.

As will be appreciated by those of ordinary skill in the art, the combination of the first fiber guide 188 and the second fiber guide 189 provides the desired or predetermined minimum bend protection angle for the fiber.

As will be appreciated by those of reasonable skill in the art, there are numerous embodiments to this invention, and variations of elements and components which may be used, all within the scope of this invention.

One embodiment of this invention for example involves a fiber optic bend radius protection apparatus for use in combination with a first set of at least one fiber optic cable and a second set of at least one fiber optic cable spaced vertically below the first set of at least one fiber optic cable, the bend radius protection apparatus comprising: a first fiber guide with a curved fiber support surface which is disposed to receive the first set of at least one fiber optic cable, the fiber support surface having a predetermined bend radius; a second fiber guide spaced below the first fiber guide, and disposed to receive the second set of at least one fiber optic cable, and further disposed to receive the first set of at least one fiber optic cable from the first fiber guide, the second fiber guide having a curved fiber support surface with a predetermined bend radius for a minimum bend protection angle; wherein the first fiber guide and the second fiber guide combine to provide the predetermined bend radius for the minimum bend protection angle for fiber optic cables supported by both the first fiber guide and the second fiber guide.

The minimum bend protection angle may be sixty degrees or more, but preferably at least ninety degrees.

Some embodiments of this invention are most effective or useful when the second set of at least one fiber optic cable is spaced below the first set of at least one fiber optic cable a distance equal to or less than the predetermined bend radius Additional embodiments of this invention provide a ready way to access, place and remove fiber optic cable from a fiber guide with a movable side guide that provides a side retention mechanism for one and/or two fiber guide rails. In the embodiment in which the movable side guide pivots to provide this for two fiber guides, a second end of the side guide extends downward to a position adjacent the second fiber guide support surface to prevent fiber optic cable from being dislodged from the second fiber guide support surface when the side guide is in the first position and retracts from the second fiber guide support surface when the side guide is in the second position, thereby easing the ability to move fiber optic cable on and off the second fiber guide support surface. In embodiment, the preferred embodiment, the side guide is pivotally mounted to provide movement of the side guide in the direction the fiber optic cable is oriented.

This invention is not limited to two fiber guides, but instead embodiments include three or more fiber guides as well.

Embodiments of this invention also include high density fiber optic connector assemblies with a bend radius protection apparatus therein.

Embodiments of this invention may also include a fiber optic bend radius protection apparatus with the fiber guides as described above and wherein dissimilar vertical and horizontal lengths of the fiber guides are utilized on vertically adjacent fiber guides.

Embodiments of this invention also include a fiber optic cable support apparatus for use in combination with a first set of at least one fiber optic cable, comprising: a first fiber guide with a curved fiber support surface which is disposed to receive the first set of at least one fiber optic cable, the fiber support surface having a predetermined bend radius; a support surface side guide pivotally mounted adjacent to a side of the first fiber guide, such that a first end of the side guide may be pivoted between a first position in which the side guide extends above the fiber support surface of the first fiber guide to prevent fiber optic cable from being dislodged from the first fiber guide support surface; and further wherein the first end of the side guide may be pivoted to a second position which is recessed from the first position, thereby easing the ability to move fiber optic cable on and off the first fiber guide support surface.

Further and additional embodiments would then include the foregoing but further include a second fiber guide spaced below the first fiber guide, and disposed to receive a second set of at least one fiber optic cable, the second fiber guide having a curved fiber support surface with a predetermined bend radius for a minimum bend protection angle; and further wherein a second end of the side guide extends downward to a position adjacent the second fiber guide support surface to prevent fiber optic cable from being dislodged from the second fiber guide support surface when the side guide is in the first position; and wherein the second end of the side guide is retracted from the second fiber guide support surface when the side guide is in the second position, thereby easing the ability to move fiber optic cable on and off the second fiber guide support surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fiber optic bend radius protection apparatus for use in combination with a first set of at least one fiber optic cable and a second set of at least one fiber optic cable spaced apart from the first set of at least one fiber optic cable, the bend radius protection apparatus comprising:
   (a) a first fiber guide with a curved fiber support surface which is disposed to receive the first set of at least one fiber optic cable, the fiber support surface having a predetermined bend radius;
   (b) a second fiber guide spaced apart from the first fiber guide, and disposed to receive the second set of at least one fiber optic cable, and further disposed to receive the first set of at least one fiber optic cable from the first fiber guide, the second fiber guide having a curved fiber support surface with a predetermined bend radius for a minimum bend protection angle;
   wherein the first fiber guide and the second fiber guide combine to provide the predetermined bend radius for the minimum bend protection angle for fiber optic cables supported by both the first fiber guide and the second fiber guide.

2. A fiber optic bend radius protection apparatus as recited in claim 1, and wherein the minimum bend protection angle is at least sixty degrees.

3. A fiber optic bend radius protection apparatus as recited in claim 1, and wherein the minimum bend protection angle is at least ninety degrees.

4. A fiber optic bend radius protection apparatus as recited in claim 1, and wherein the second set of at least one fiber optic cable is spaced below the first set of at least one fiber optic cable a distance equal to or less than the predetermined bend radius.

5. A fiber optic bend radius protection apparatus as recited in claim 1, and further comprising a support surface side guide pivotally mounted adjacent to a side of the first fiber guide, such that a first end of the side guide is configured to be pivoted between a first position in which the side guide extends above the fiber support surface of the first fiber guide to prevent fiber optic cable from being dislodged from the first fiber guide support surface; and further wherein the first end of the side guide is configured to be pivoted to a second position which is recessed from the first position, thereby easing the ability to move fiber optic cable on and off the first fiber guide support surface.

6. A fiber optic bend radius protection apparatus as recited in claim 5, and further wherein a second end of the side guide extends downward to a position adjacent the second fiber guide support surface to prevent fiber optic cable from being dislodged from the second fiber guide support surface when the side guide is in the first position; and wherein the second end of the side guide is retracted from the second fiber guide support surface when the side guide is in the second position, thereby easing the ability to move fiber optic cable on and off the second fiber guide support surface.

7. A fiber optic cable support apparatus as recited in claim 5, and wherein the side guide is pivotally mounted to provide movement of the side guide in the direction the fiber optic cable is oriented.

8. A fiber optic cable bend radius protection apparatus as recited in claim 1, and further comprising a third fiber guide above the first fiber guide, the third fiber guide having a curved fiber support surface with a predetermined bend radius and being disposed to receive a third set of at least one fiber optic cable, and further wherein the first, second and third fiber guides combine to provide the predetermined bend radius for the minimum bend protection angle for fiber optic cables supported by all the first fiber guide, the second fiber guide and the third fiber guide.

9. A fiber optic cable bend radius protection apparatus as recited in claim 1, and further wherein the second set of at least one fiber optic cable are spaced vertically below the first set of at least on fiber optic cable.

10. A fiber optic cable bend radius protection apparatus as recited in claim 1, and further wherein the second set of at least one fiber optic cable are horizontally spaced apart from the first set of at least on fiber optic cable.

11. A high density fiber optic connector assembly with a bend radius protection apparatus, comprising:
   (a) an assembly housing;
   (b) a first set of fiber optic connectors mounted on said assembly housing, each set of fiber optic connectors including a first set of at least one fiber optic cable operatively attached thereto;
   (c) a second set of fiber optic connectors mounted on said assembly housing a distance apart from the first set of fiber optic connectors, the second set of fiber optic connectors including a second set of at least one fiber optic cable operatively attached thereto;

(d) a first fiber guide with a curved fiber support surface which is disposed to receive the first set of at least one fiber optic cable, the fiber support surface having a predetermined bend radius;

(e) a second fiber guide spaced apart from the first fiber guide, and disposed to receive the second set of at least one fiber optic cable, and further disposed to receive the first set of at least one fiber optic cable from the first fiber guide, the second fiber guide having a curved fiber support surface with a predetermined bend radius for a minimum bend protection angle;

wherein the first fiber guide and the second fiber guide combine to provide the predetermined bend radius for the minimum bend protection angle for fiber optic cables supported by both the first fiber guide and the second fiber guide.

12. A fiber optic bend radius protection apparatus for use in combination with a first set of at least one fiber optic cable and a second set of at least one fiber optic cable spaced apart from the first set of at least one fiber optic cable, the bend radius protection apparatus comprising:

(a) a first fiber guide with a curved fiber support surface which is disposed to receive the first set of at least one fiber optic cable, the fiber support surface having a predetermined bend radius;

(b) a second fiber guide spaced apart from the first fiber guide, and disposed to receive the second set of at least one fiber optic cable, and further disposed to receive the first set of at least one fiber optic cable from the first fiber guide, the second fiber guide having a curved fiber support surface with a predetermined bend radius for a minimum bend protection angle;

wherein the first fiber guide has a shorter height than the second fiber guide.

13. A fiber optic bend radius protection apparatus as recited in claim 12, and further wherein the first fiber guide has a shorter length than the second fiber guide.

14. A fiber optic bend radius protection apparatus as recited in claim 12, and wherein the minimum bend protection angle is at least sixty degrees.

15. A fiber optic bend radius protection apparatus as recited in claim 12, and wherein the minimum bend protection angle is at least ninety degrees.

16. A fiber optic bend radius protection apparatus as recited in claim 12, and wherein the second set of at least one fiber optic cable is spaced apart from the first set of at least one fiber optic cable a distance equal to or less than the predetermined bend radius.

17. A fiber optic bend radius protection apparatus as recited in claim 12, and further comprising a support surface side guide pivotally mounted adjacent to a side of the first fiber guide, such that a first end of the side guide is configured to be pivoted between a first position in which the side guide extends above the fiber support surface of the first fiber guide to prevent fiber optic cable from being dislodged from the first fiber guide support surface; and further wherein the first end of the side guide is configured to be pivoted to a second position which is recessed from the first position, thereby easing the ability to move fiber optic cable on and off the first fiber guide support surface.

18. A fiber optic bend radius protection apparatus as recited in claim 17, and further wherein a second end of the side guide extends downward to a position adjacent the second fiber guide support surface to prevent fiber optic cable from being dislodged from the second fiber guide support surface when the side guide is in the first position; and wherein the second end of the side guide is retracted from the second fiber guide support surface when the side guide is in the second position, thereby easing the ability to move fiber optic cable on and off the second fiber guide support surface.

19. A fiber optic cable support apparatus as recited in claim 17, and wherein the side guide is pivotally mounted to provide movement of the side guide in the direction the fiber optic cable is oriented.

20. A fiber optic cable bend radius protection apparatus as recited in claim 12, and further comprising a third fiber guide spaced apart from the first fiber guide, the third fiber guide having a curved fiber support surface with a predetermined bend radius and being disposed to receive a third set of at least one fiber optic cable, and further wherein the first, second and third fiber guides combine to provide the predetermined bend radius for the minimum bend protection angle for fiber optic cables supported by all the first fiber guide, the second fiber guide and the third fiber guide.

21. A fiber optic cable bend radius protection apparatus as recited in claim 12, and further wherein the second set of at least one fiber optic cable are spaced vertically below the first set of at least on fiber optic cable.

22. A fiber optic cable bend radius protection apparatus as recited in claim 12, and further wherein the second set of at least one fiber optic cable are horizontally spaced apart from the first set of at least on fiber optic cable.

23. A fiber optic cable support apparatus for use in combination with a first set of at least one fiber optic cable, comprising:

(a) a first fiber guide with a curved fiber support surface which is disposed to receive the first set of at least one fiber optic cable, the fiber support surface having a predetermined bend radius;

(b) a support surface side guide pivotally mounted adjacent to a side of the first fiber guide, such that a first end of the side guide is configured to be pivoted between a first position in which the side guide extends above the fiber support surface of the first fiber guide to prevent fiber optic cable from being dislodged from the first fiber guide support surface; and further wherein the first end of the side guide is configured to be pivoted to a second position which is recessed from the first position, thereby easing the ability to move fiber optic cable on and off the first fiber guide support surface.

24. A fiber optic cable support apparatus as recited in claim 23, and further comprising: a second fiber guide spaced below the first fiber guide, and disposed to receive a second set of at least one fiber optic cable, the second fiber guide having a curved fiber support surface with a predetermined bend radius for a minimum bend protection angle; and further wherein a second end of the side guide extends downward to a position adjacent the second fiber guide support surface to prevent fiber optic cable from being dislodged from the second fiber guide support surface when the side guide is in the first position; and wherein the second end of the side guide is retracted from the second fiber guide support surface when the side guide is in the second position, thereby easing the ability to move fiber optic cable on and off the second fiber guide support surface.

\* \* \* \* \*

UNITED STATES PATENT AND TRADEMARK OFFICE
CERTIFICATE OF CORRECTION

PATENT NO. : 6,678,455 B1
DATED : January 13, 2004
INVENTOR(S) : Knight

It is certified that error appears in the above-identified patent and that said Letters Patent is hereby corrected as shown below:

Column 8,
Lines 51 and 55, replace "the first set of at least on fiber optic cable." with -- the first set of at least one fiber optic cable. --

Column 10,
Line 25, replace "first set of at least on fiber optic cable." with -- first set of at least one fiber optic cable. --
Line 29, replace "the first set of at least on fiber optic cable." with -- the first set of at least one fiber optic cable. --

Signed and Sealed this

Twentieth Day of July, 2004

JON W. DUDAS
*Acting Director of the United States Patent and Trademark Office*